United States Patent
Castner et al.

[15] 3,670,050
[45] June 13, 1972

[54] METHOD FOR PRODUCTION OF MODIFIED OXYMETHYLENE POLYMERS

[72] Inventors: Claire J. Castner, Nutley, N.J.; Robert V. Russo, Brooklyn, N.Y.; Raymond A. Berard, Westfield, N.J.

[73] Assignee: Celanese Corporation, New York, N.Y.

[22] Filed: June 16, 1970

[21] Appl. No.: 46,820

[52] U.S. Cl..................260/860, 260/45.7 P, 260/67 TN
[51] Int. Cl. ..........................C08g 1/24, C08g 39/10
[58] Field of Search..............260/67 TN, 45.7 P, 77.5 AR, 260/77.5 SS, 860

[56] References Cited

UNITED STATES PATENTS

| | | | |
|---|---|---|---|
| 2,915,496 | 12/1959 | Swart et al. | 260/45.7 P |
| 3,017,389 | 1/1962 | Langsdorf et al. | 260/67 FP |
| 3,293,207 | 12/1966 | Perry | 260/45.7 P |
| 3,364,157 | 1/1968 | Halek et al. | 260/67 FP |
| 3,380,966 | 4/1968 | Fouts | 260/67 TN |
| 3,392,153 | 7/1968 | Hostettler et al. | 260/77.5 AR |
| 3,455,867 | 7/1969 | Berardinelli et al. | 260/67 TN |
| 3,475,383 | 10/1969 | Stewart | 260/67 TN |
| 3,565,863 | 2/1971 | Schmelzer et al. | 260/67 TN |

*Primary Examiner*—William H. Short
*Assistant Examiner*—L. M. Phynes
*Attorney*—Thomas J. Morgan, Linn I. Grim and Richard A. Lucey

[57] ABSTRACT

Disclosed herein is method for production of modified oxymethylene polymers by a coupling reaction of an oxymethylene polymer and a dissimilar organic polymer with an isocyanate or an isothiocyanate. The method comprises the consecutive steps of (1) forming an admixture of an organic tin catalyst and the reactive components; and then (2) adding an organic phosphite to enhance the reaction rate. When this sequence is followed a synergistic reaction rate is observed.

12 Claims, No Drawings

METHOD FOR PRODUCTION OF MODIFIED OXYMETHYLENE POLYMERS

The present invention relates to a method for production of modified oxymethylene polymers by a coupling reaction of an oxymethylene polymer and a dissimilar organic polymer with an isocyanate or isothiocyanate.

According to the present invention the reaction rate of the coupling of an oxymethylene polymer and a dissimilar organic polymer with an isocyanate or an isothiocyanate can be dramatically increased by a method comprising the consecutive steps of (1) forming an admixture of an organic tin catalyst and the reactive components; and then (2) adding an organic phosphite to enhance the reaction rate. When this sequence is followed a synergistic catalysis rate is observed.

Oxymethylene polymers having recurring —CH$_2$O— units have been known for many years. They may be prepared by polymerizing a source of oxymethylene units such as anhydrous formaldehyde or trioxane, a cyclic trimer of formaldehyde.

High molecular weight solid polyoxymethylenes have been prepared by polymerizing trioxane in the presence of cationic catalysts, including such compounds as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, thionyl chloride, fluorosulfonic acid, phosphorus trichloride, titanium tetrachloride, ferric chloride, zirconium tetrachloride, aluminum trichloride, stannic chloride, stannous chloride, and the alkane sulfonic acids as ethane sulfonic acid and methane sulfonic acid.

The preferred catalysts are boron fluoride and the boron fluoride complexes with water (such as boron fluoride monohydrate, boron fluoride dihydrate, and boron fluoride trihydrate) and boron fluoride coordinate complexes with organic compounds, particularly those in which oxygen or sulfur is the donor atom. The coordinate complex of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. The boron fluoride complexes with phenol and with acetic acid are also very effective. Other specific boron fluoride complexes, for example, are the complexes with ethanol, methanol, propanol, butanol, methyl acetate, ethyl acetate, phenyl acetate, benzoic acid, acetic anhydride, acetone, methyl ethyl ketone, dimethyl ether, methyl phenyl ether, acetaldehyde, chloral, dimethyl sulfide, and ethyl mercaptan.

Suitable catalysts are disclosed in U.S. Pats. No. 2,989,505; 2,989,506; 2,989,507; 2,989,508; 2,989,509; all of Donald E. Hudgin and Frank M. Berardinelli; 2,989,510, of George J. Bruni; 2,989,511 of Arthur W. Schnizer, and in the article by Kern et al. in Angewandte Chemie, 73, pp. 176–186 (Mar. 21, 1961).

Oxymethylene polymers of improved thermal stability may be prepared by introducing into the polymer chains or attaching to the ends of the polymer chains, structures which are resistant to thermal detachment. The polymers may incorporate interspersed oxyalkylene units with adjacent carbon atoms and preferably oxymethylene units as disclosed in U.S. Pat. No. 3,027,352 of Walling, Brown and Bartz. Copolymers of this type may be described as having at least one chain containing oxymethylene (—CH$_2$O—) units (usually at least 85 mole percent) interspersed with (—OR—) units wherein R is a divalent radical containing at least two carbon atoms directly linked to each other and positioned in the chain between the two valences, with any substituent in the R radical being inert.

Specific interspersed monomeric units which may be incorporated are those derived from lactones, carbonates, cyclic acid anhydrides or ethylenically unsaturated compounds such as styrene, divinyl ether, vinyl acetate, vinyl methyl ketone or acrolein as disclosed in the aforementioned article by Kern et al.

As used in the specification and claims, the term "oxymethylene polymers" denotes homopolymers and copolymers (including terpolymers, etc.) having at least 60% recurring oxymethylene units, and further includes substituted oxymethylene polymers, wherein the substituents are inert, i.e., do not participate in undesirable side reactions.

For some applications molecular modification of oxymethylene polymers is desirable to provide polymers of modified strength characteristics, flow characteristics, solvency, crystallinity, thermal stability, etc. Such molecular modification is particularly desirable where property modification by blending two polymers is impossible as, for example, by polymer incompatibility.

U.S. Pat. No. 3,364,157, issued on Jan. 16, 1968 to G. W. Halek et al., discloses a modified oxymethylene polymer comprising an oxymethylene polymer coupled to a dissimilar organic polymer with an isocyanate or an isothiocyanate. According to the teachings of this patent the copolymer may be prepared by the coupling reaction of polymeric segments, at least one of which is an oxymethylene polymer, in the presence of a bifunctional coupling agent, and preferably those having at least one isocyano or isothiocyano group. In such a reaction system, an isocyano or isothiocyano prepolymer may be generated in situ, where a reaction with one polymeric segment is preferential over another, or coupling may occur through substantially simultaneous reactions of the coupling agent with the polymeric materials.

Thus, according to said U.S. Pat. No. 3,364,157, the copolymers may be provided by the coupling of the polymeric chains in reaction with a bifunctional compound having at least one isocyano or isothiocyano group, or by the reaction of a separately prepared isocyano or isothiocyano terminated prepolymer with another polymeric chain having a terminal or pendant group containing active or acidic hydrogen.

The presence of acidic hydrogen may be determined by the Zerewitnoff method, utilizing the reaction of such active, or acidic hydrogen compounds with Grignard reagents, liberating RH corresponding to RMgX. Thus, when a compound containing acidic hydrogen is reacted with methyl magnesium iodide, methane is liberated, giving a positive test. The amount of liberated methane may be collected and measured, and the number of active hydrogen atoms per mole determined, where the molecular weight is known. A further description of the Zerewitnoff test including modifications of the procedure for various applications, can be found in Grignard Reactions of Non-Metallic Substances, Kharasch, M.S., and Reinmuth, O. (Prentice-Hall, Inc., New York, 1954), pp, 1,166–1,174.

U.S. application, Ser. No. 874,386, filed on Nov. 5, 1969 by C. Castner et al. and entitled "Stabilized Polyoxymethylene Compositions" discloses that such copolymers may be stabilized against pyrolytic and oxidative degradation by the addition of up to about 2.5 weight percent, based upon the total weight of the copolymer, of an organic phosphite represented by the formula:

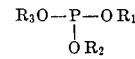

wherein $R_1$, $R_2$ and $R_3$ are organic radicals selected from the group of alkyl of from about four to about 12 carbon atoms, alkylene of from about six to about 12 carbon atoms, cyclic alkyl aryl, alkyl mono and di substituted aryl, aryl substituted alkyl and aryl wherein alkyl is from about four to about 12 carbon atoms and aryl is from about five to about eight carbon atoms. Preferably $R_1$, $R_2$ and $R_3$ are all alkyl substituted aryl. Most preferably $R_1$, $R_2$ and $R_3$ are all mono or dinonyl substituted phenyl.

According to the teaching of said Ser. No. 874,386 the phosphite stabilizer may be added to the composition at any time, either with the base oxymethylene polymer prior to the addition of the modifying component (e.g., an isocyanate terminated composition) or even after the formation of the entire modified oxymethylene composition.

The present invention is based on the discovery that when starting with essentially the three basic components of the copolymer, i.e., the oxymethylene polymer, the dissimilar organic polymer containing acidic or active hydrogen and the isocyanate or isothiocyanate, the reaction rate of the simultaneous coupling can be dramatically increased by a method comprising the consecutive steps of (1) forming an admixture of an organic tin catalyst and the reactive components; and then (2) adding an organic phosphite to enhance the reaction rate. If this sequence is followed a synergistic reaction rate of the coupling reaction will be observed.

THE OXYMETHYLENE POLYMER

The oxymethylene polymer that is modified according to the method this invention may be, as previously has been indicated, homopolymeric oxymethylene or an oxymethylene copolymer. The two are not the full equivalent of each other as the main or primary component in the method of this invention. The preferred primary component is a copolymer of oxymethylene.

The oxymethylene polymers useful in this invention may be prepared as broadly and more specifically described in the third through the eighth paragraphs of this specification and in the citations therein given. An oxymethylene copolymer of the kind disclosed and claimed in the aforementioned Walling et al. patent is especially suitable for use as the copolymer that is modified according to the method of this invention.

Thus, the oxymethylene copolymer used in carrying this invention into effect may be a polymer having a structure comprising recurring units represented by the general formula (I) 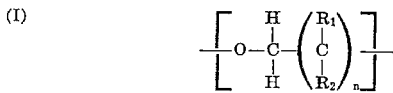

wherein each $R_1$ and $R_2$ is selected from the group consisting of hydrogen, lower alkyl and halogen-substituted lower alkyl radicals, and wherein $n$ is an integer from zero to 3, inclusive, and $n$ being zero in from 85 percent to 99.9 percent of the recurring units. Each lower alkyl radical preferably has from one to two carbon atoms, inclusive. The oxymethylene copolymer may be defined more specifically as a normally solid, substantially water-insoluble copolymer, the repeating units of which consist essentially of (A) —OCH$_2$— groups interspersed with (B) groups represented by the general formula (II) 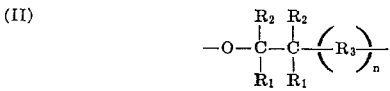

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to 3 inclusive.

Each lower alkyl radical preferably has from one to two carbon atoms, inclusive. The —OCH$_2$— units of (A) constitute from 85 percent to 99.9 percent of the recurring units. The units of (B) are incorporated into the copolymer during the step of copolymerization to produce the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers employed in making the oxymethylene copolymer are those represented by the general formula (III) 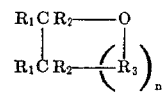

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene and lower alkyl and haloalkyl-substituted oxymethylene radicals, and $n$ is an integer from zero to 3 inclusive. Each lower alkyl radical preferably has from one to two carbon atoms inclusive.

The preferred cyclic ethers used in the preparation of the oxymethylene copolymers are ethylene oxide and 1,3-dioxolane, which may be represented by the formula (IV) 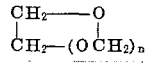

wherein $n$ represents an integer from zero to 2, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalysts used in preparing the oxymethylene copolymers are the aforementioned boron fluoride coordinate complexes, numerous examples of which are given in the previously identified Walling et al. patent. Reference is made to this patent for further information concerning the polymerization conditions, amount of catalyst employed, etc.

The oxymethylene copolymers produced from the preferred cyclic ethers have a structure composed substantially of oxymethylene and oxyethylene groups in a ratio of from about 6 to 1 to about 1,000 to 1.

The oxymethylene copolymers described briefly above are members of the broader group of such copolymers that are useful in practicing the present invention and which have at least one chain containing recurring oxymethylene units interspersed with —OR— groups in the main polymer chain. In such —OR— groups, R represents a divalent radical containing at least two carbon atoms linked directly to each other and positioned in the polymer chain between the two valences with any substituents on said radical being inert, that is, substituents that are free from interfering functional groups and do not induce undesirable reactions under the conditions involved. Among such copolymers that advantageously may be employed in practicing this invention are oxymethylene copolymers containing from about 60 mole percent to 99.9 mole percent of recurring oxymethylene groups to form 0.1 mole percent to about 40 mole percent of —OR— groups, and more particularly from 60:99.6 mole percent of the former to 0.4:40 mole percent of the latter. As indicated hereinbefore, the most preferred copolymers are those having from about 85 mole percent to 99.9 mole percent of recurring oxymethylene groups and from 0.1 to 15 mole percent of —OR— groups. In a preferred embodiment R may be, for example, an alkylene or substituted alkylene group containing at least two carbon atoms.

Also useful in carrying the instant invention into effect are oxymethylene copolymers having a structure comprising recurring units consisting essentially of those represented by the general formula (V) 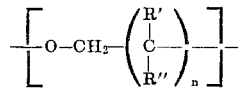

wherein n represents an integer from zero to 5, inclusive, and representing zero in from 60 to 99.6 mole percent of the recurring units; and R' and R'' represent inert substituents, that is, substituents which are free from interfering functional groups and will not induce undesirable reactions. Thus, one advantageously may utilize oxymethylene copolymers having a structure comprising oxymethylene and oxyethylene recurring units wherein from 60 to 99.9 e.g., from 60 or 70 to 99.6 mole percent of the recurring units are oxymethylene units.

It has previously been indicated that especially preferred copolymers employed in practicing the present invention are those containing in their molecular structure oxyalkylene units having adjacent carbon atoms which are derived from cyclic ethers having adjacent carbon atoms. Such copolymers may be prepared by copolymerizing trioxane or formaldehyde with a cyclic ether represented by the general formula (VI) 

wherein n represents an integer from zero to 4, inclusive, and R represents a divalent radical selected from the group consisting of (a) $CH_2$, (b) $CH_2O$, and (c) any combination of $CH_2$ and $CH_2O$.

Examples of specific cyclic ethers that may be used in preparing copolymers of the kind embraced by Formula VI, in addition to the cyclic ethers previously mentioned with reference to the copolymers embraced by Formula IV, and the acetals and cyclic esters that may be employed instead of cyclic ethers, are 1,3,5-trioxepane, 1,3-dioxepane betapropiolactone, gammabutyrolactone, neopentyl formal, pentaerythritol diformal, paraldehyde, and butadiene monoxide. In addition, glycols including, for example, ethylene glycol, diethylene glycol, 1,3-butylene glycol, propylene glycol and the like may be employed instead of the cyclic ethers, acetals and esters just mentioned.

Although formaldehyde is a desirable source of the oxymethylene moiety (i.e., $R_2O$ wherein $R_2$ represents methylene or substituted methylene), it will be understood, of course, by those skilled in the art that instead of formaldehyde, other sources of the oxymethylene moiety may be used; e.g., paraformaldehyde, trioxane, and the like. One may also employ cyclic acetals, e.g., 1,3,5-trioxepane, in lieu of both the cyclic ether and formaldehyde.

The term "oxymethylene" as used in the specification and claims and this application, unless it is clear from the context that a more specific meaning is intended, includes substituted oxymethylene, wherein the substituents are inert with respect to the reactions in question; that is, the substituents are free from any interfering functional group or groups that would cause or result in the occurrence of undesirable reactions.

Also, as used in the specification and claims of this application, the term "copolymer" means polymers obtained by copolymerization of two or more different monomers (i.e., polymers containing in their molecular structure two or more different monomer units), and includes terpolymers, tetrapolymers and higher multicomponent polymers. The term "polymer" (unless it is clear from the context that the homopolymer or a copolymer is intended) includes within its meaning both homopolymers and copolymers.

In some cases it is especially desirable to use oxymethylene terpolymers as the oxymethylene polymer component in the method of this invention, e.g., in making molding compositions especially adapted for use in making blow-molded or otherwise shaped articles e.g., bottles or other types of containers. Oxymethylene terpolymers that are particularly useful in such applications, as well as for other purposes, include those disclosed in Great Britain Pat. No. 1,026,777 issued to W. E Heinz and F. B McAndrew on Apr. 20, 1966, assigned to the same assignee as the instant invention, and which by this cross-reference is made a part of the disclosure of the present application.

The oxymethylene polymers that are modified according to the method of this invention are thermoplastic materials having a molecular weight of at least 5,000, a melting point of at least 100° C. and an inherent viscosity of at least 0.6 (measured at 60° C. in a 0.1 weight percent solution in p-chlorophenol containing 2 weight percent of alpha-pinene), preferably they have a molecular weight of at least 10,000, a melting point of at least 150° C. and an inherent viscosity of at least 1.0 (measured at 60° C. in a 0.1 weight percent solution in p-chlorophenol containing 2 weight percent of alpha-pinene).

The oxymethylene polymer component used in the method of this invention may be, if desired, oxymethylene polymers that have been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in Canadian Pat. No. 725,734 issued to Frank M. Berardinelli on Jan. 11, 1966, assigned to the same assignee as the present invention, and by this cross-reference is made a part of the disclosure of the instant application.

Catalysts suitable for use in polymerizing trioxane or formaldehyde alone or with other copolymerizable components in producing the oxymethylene polymers that are modified according to the method of this invention may be widely varied. Preferred catalysts are cationic catalysts, including such inorganic fluorine-containing catalysts as boron trifluoride, antimony trifluoride, antimony fluoroborate, bismuth trifluoride, bismuth oxyfluoride, nickelous fluoride, aluminum trifluoride, titanium tetrafluoride, manganous fluoride, maganic fluoride, mercuric fluoride, silver fluoride, zinc fluoride, ammonium bifluoride, phosphorous penta-fluoride, hydrogen fluoride, and compounds containing these materials, such as boron fluoride coordinate complexes with organic compounds, particularly those in which oxygen or sulfur is a donor atom.

Other suitable catalysts include thionyl chloride, fluorosulfonic acid, methanesulfonic acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials, such as boron fluoride monohydrate, boron fluoride dihydrate and boron fluoride trihydrate as well s boron fluoride coordinate complexes with organic compounds as mentioned previously.

THE DISSIMILAR ORGANIC POLYMER

The dissimilar organic polymer which may be used according to the present invention may be any organic polymer containing at least two active hydrogen containing groups as determined by the Zerewitinoff method, but it is preferred to use a polyhydric polyalkylene ether, a polyhydric polythioether and most preferably a hydroxyl polyester obtained by a process which comprises condensing a polycarboxylic acid and a polyhydric alcohol.

The molecular weight of the organic polymer containing at least two active hydrogen containing groups may vary over a wide range. Preferably, however, the organic polymer has a molecular weight of at least about 200 and preferably between 500 and about 5,000, and most preferably between about 1,000 and about 3,000, with a hydroxyl number within the range of from about 20 to about 800, preferably between about 20 and about 250, and most preferably between about 30 and about 120, and acid numbers where applicable below about 5.

Any suitable hydroxyl polyester may be used as the organic polymer having a molecular weight of above about 200 such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethylglutaric acid, α,β-diethylsuccinic acid, hemimellitic acid, trimellitic acid, trimesic acid, mellophanic acid, prehnitic acid, pyromellitic acid, citric acid, benzenepentacarboxylic acid, 1,4-cyclohexanedicarboxylic acid, 3,4,9,10-perylene-tetracarboxylic acid and the like. Preferably the polycarboxylic acid is adipic or azelaic acid. Any suitable polyhydric alcohol may be used such as, for example, ethylene glycol, 1,3-propylene glycol, 1,2-propylene glycol, 1,4-butanediol, 1,3-butanediol, 1,2-butanediol, butene-1,4-diol, 1,5-pentanediol, 1,4-pentanediol, 1,3-pentanediol, 1,6-hexanediol, neopentyldiol, hexene-1,6-diol, 1,7-heptanediol, diethylene glycol, glycerine, trimethylolpropane, 1,3,6-hexanetriol, triethanolamine, pentaerythritol, sorbitol and the like. Preferably the poly-hydric alcohol is 1,4 butanediol, 1,6 hexanediol or neopentyldiol. It is preferred that the major portion of the alcohols and acids be di- functional.

Any suitable polyhydric polyalkylene ether may be used such as, for example, the condensation product of an alkylene oxide or of a polyhydric alcohol or of an alkylene oxide with a polyhydric alcohol. Any suitable polyhydric alcohol may be used such as, those disclosed above for use in the preparation of the hydroxyl polyesters. Any suitable alkylene oxide may be used, such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylolpropane, pentaerythritol and the like in the preparation of the polyhydric polyalkylene ethers so that some branching exists in the product. Generally speaking, it is advantageous to condense from about 5 to about 30 moles of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, volume 7, pages 257–262, published by Interscience Publishers Inc. (1951) or in U.S. Pat. No. 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Pats. Nos. 2,862,972 and 2,900,368.

THE COUPLING AGENT

The coupling agents are suitably bifunctional compounds having at least one isocyano (—NCO) or isothiocyano thiocyano (—NCS) group, and preferably are organic diisocyanates, (OCN—R—NCO), diisothiocyanates
(SCN—R—NCS)
or isocyanateisothiocyanates (OCN—R—NCS), but may also be of higher functionality (e.g., triisocyanates, polyisocyanates, etc.).

A preferred class of coupling agents has the general formula R (—NCX)$_n$ wherein X is an atom selected from the group consisting of oxygen and sulfur, n is an integer between 1–3, and R is an organic radical derived from the group consisting of aliphatic, cycloaliphatic and aromatic moieties having one to 20 carbon atoms, and substituted derivatives thereof, where the substituents are inert i.e., do not participate in undesirable side reactions.

Suitable compounds include, for example, aromatic diisocyanates, such as 2,4-toluene diisocyanate; 2,6-toluene diisocyanate; 1,6-toluene diisocyanate; diphenyl methane 4,4'-diisocyanate; 3,3'-dimethyl diphenyl methane 4,4'-diisocyanate; 3,3'-dimethyl 4,4'-diphenylene diisocyanate (3,3-bitoluene 4,4'-diisocyanate); m-phenylene diisocyanate; p-phenylene diisocyanate; o-phenylene diisocyanate; methane diisocyanate; chlorophenylene-2,4-diisocyanate; chlorophenylene 2,4-toluenediisocyanate; 3,3'-dichlorodiphenyl-4,4'-diisocyanate; 4-chloro-1,3-phenylene diisocyanate; xylene 1,4-diisocyante; dixylylene methane 4,4'-diisocyanate; 1,5-naphthalene diisocyanate, 1,4-naphthalene diisocyanate, and the corresponding diisothiocyanates and the isocyanateisothiocyanates; alkylene diisocyanates, such as 1,6-hexamethylene diisocyanate; 1,2-ethylene diisocyanate; 1,3-propylene diisocyanate; 1,4-tetramethylene diisocyanate; 1,5-pentamethylene diisocyanate; and the corresponding diisocyanates and the isocyanate-isothiocyanates; alkylidene diisocyanates, such as ethylidene diisocyanate and propylidene diisocyanate and the corresponding diisothiocyanates and the isocyanate-isothiocyanates; cycloaliphatic diisocyanates, such as 1,3-cyclohexylene diisocyanate; 1,3-cyclopentylene diisocyanate; 1,4-cyclohexylene diisocyanate; 4,4'-methylenebis-(cyclohexyl isocyanate) and the corresponding diisothiocyanates and isocyanate-isothiocyanates; triisocyanates, such as triphenyl methane triisocyanate; 1,3,5-benzene triisocyanate, and the corresponding isothiocyanates and isocyanate-isothiocyanates. Mixtures of any of the aforementioned compounds, such as mixtures of the 2,4 and 2,6 isomers of toluene diisocyanate, may also be desirable in certain applications.

Other bifunctional coupling agents are the combinations of a biscarbamyl chloride of a diprimary diamine and a diprimary amine, and phosgene and a diprimary diamine.

THE ORGANIC TIN CATALYST

The organic tin catalysts useful in the method of the present invention are those which are known to the art to catalyze the reaction between an isocyanate and a compound containing active or acidic hydrogen as determined by the Zerewitinoff method.

Typical of these organic tin catalysts are those having at least one direct carbon to tin bond and preferably those having from one to three carbon bonds directly to a given tin atom, and one or more catalytically intensifying bonds from said given atoms to a halogen, hydrogen, oxygen, sulfur, nitrogen or phosphorous atom.

Among the many types of tin compounds having carbon to tin bonds are:

(A) Tin compounds having four carbon to tin bonds and no intensifying bonds such as tetramethyltin, tetraethyltin, tetrapropyltin, tetrabutyltin, tetraoctyltin, tetralauryltin, tetrabenzyltin, tetrakis (2-phenylethyl) tin, tetraphenyltin, tetraparatolyltin, tetravinyltin, tetraallyltin, tetrachloromethyltin, tetramethylsulfonylmethyltin, tetra-para-methoxyphenyltin, tetra-para-nitrophenyltin, as well as unsymmetrical compounds as exemplified by 2-cyano-ethyl-tributyltin, dibutyldiphenyltin and various addition products of alkyl, aryl and aralkyltin hydrides with unsaturated organic compounds such as acrylonitrile, allyl cyanide, crotonitrile, acrylamide, methyl acrylate, allyl alcohol, acroleindiethyl acetal, vinyl acetate, styrene, etc.

(B) Tin compounds having n carbon to tin bonds and 4-n intensifying bonds from tin to halogen or hydrogen atoms or hydroxyl groups in which n is an integer from 1 to 3, such as trimethyltin chloride, tributyltin chloride, triocytltin chloride, triphenyltin chloride, trimethyltin bromide, tributyltin fluoride, triallyltin chloride, tributyltin hydride, triphenyltin hydride, trimethyltin hydroxide, tributyltin hydroxide, dimethyltin dichloride, dibutyltin dichloride, dioctyltin dichloride, bis (2-phenylethyl) tin dichloride, diphenyltin dichloride, divinyltin dichloride, diallyltin dibromide, diallyltin diiodide, dibutyltin difluoride, bis (carboethoxymethyl) tin diiodide, bis (1,3-diketopentane) tin dichloride, dibutyltin dihydride, butyltin trichloride and octyltin trichloride.

(C) Tin compounds having two carbon to tin bonds and a catalytically intensifying double bond from tin to oxygen or sulfur, such as dimethyltin oxide, diethyltin oxide, dibutyltin oxide, dioctyltin oxide, dilauryltin oxide, diphenyltin oxide and diallyltin oxide, all prepared by hydrolysis of the corresponding dihalides, as well as bis-2-phenylethyltin oxide, (HOOC (CH$_2$)$_5$)$_2$SnO, (CH$_3$OCH$_2$(CH$_2$OCH$_2$)$_{x-1}$CH$_2$)$_2$SnO (CH$_3$OCH$_2$(CH$_2$OCH$_2$)$_{x-1}$CH$_2$O(CH$_2$)$_5$)$_2$SnO and dibutyltin sulfide, the x's being whole integers.

(D) Tin compounds having n carbon to tin bonds and 4-n intensifying bonds from tin to oxygen, sulfur, nitrogen or phosphorous linking organic radicals, n being an integer from 1 to 3, such as tributyltin methoxide, tributyltin butoxide, tributyltin acetate, tributyltin N-piperazinylthiocarbonylmercaptide, tributyltin phosphorous dibutoxide (prepared as indicated immediately below:

$2(C_4H_9O)_3P + P Cl_3 \rightarrow 3(C_4H_9O)_2P Cl$ $(C_4H_9)_3Sn Cl + 2Na \rightarrow (C_4H_9)_3Sn Na + Na Cl$ $(C_4H_9)_3Sn Na + (C_4H_9O)_2P Cl \rightarrow (C_4H_9)_3Sn P(OC_4H_9)_2 + Na Cl)$ dibutyltin dibutoxide, (C$_4$H$_9$)$_2$Sn(OCH$_2$(CH$_2$OCH$_2$)$_{x-1}$CH$_2$CH$_3$)$_2$ dibutyl bis (O-acetylacetonyl) tin, dibutyltin bis (octylmaleate), "Advastab T-50-LT" (a dibutyltin compound found, upon analysis, to contain two ester groups), "Advastab 17M" (a dibutyltin compound found, upon analysis, to contain two sulfur-containing ester groups), Argus Mark A. Thermolite 20 (two trade-names for dibutyltin bis (thiododecoxide)), dibutyltin bis (octyl thioglycolate), dibutyltin bis (N-morpholinylcarbonylmethylmercaptide), dibutyltin dibenzenesulfonamide, dimethyltin diacetate, diethyltin diacetate, dibutyltin diacetate, dioctyltin diacetate, dilauryltin diacetate, dibutyltin dilaurate, dibutyltin maleate, dibutyltin bis(N-piperazinylthiocarbonylmercaptide), dioctyltin bis-(N-piperazinylthiocarbonylmercaptide), octyltin tris (thiobutoxide), butyltin triacetate, methylstannonic acid, ethylstannonic acid, butylstannonic acid, octylstannonic acid, HOOC(CH$_2$)$_5$ SnOOH (CH$_3$)$_3$N (CH$_2$)$_5$SnOOH CH$_3$OCH$_2$(CH$_2$OCH$_2$)$_{x-1}$CH$_2$SnOOH and CH$_3$OCH$_2$(CH$_2$OCH$_2$)$_{x-1}$CH$_2$O(CH$_2$)$_5$SnOOH in which the x's are positive integers.

(E) Polystannic compounds having carbon to tin bonds and preferably also intensifying bonds from tin to halogen, hydrogen, oxygen, sulfur, nitrogen or phosphorous, such as HOOSn(CH$_2$)$_x$HOOSnCH$_2$(CH$_2$OCH$_2$)$_x$CH$_2$SnOOH the x's being positive integers, bis-trimethyltin, bis-triphenyltin, bis-tributyl distannoxane, dibutyltin basic laurate, dibutyltin basic hexoxide and other polymeric organo-tin compounds containing carbon to tin bonds and preferably also intensifying bonds, e.g., those having repeating $$\begin{array}{c} R \\ | \\ -Sn O- \\ | \\ R \end{array}$$

groups, dimers and trimers of (R$_2$SnY)n and the like in which the R's may be alkyl, aryl or aralkyl radicals and the Y's are chalcogens, as well as many other organo-tin compounds heretofore proposed as heat and light stabilizers for chlorinated polymers and available under such tradenames as "Advastab" "Nuostabe", and "Thermolite".

Other useful organic tin catalysts are stannous octoate; and the organo-tin chelates as disclosed in U.S. Pat. Nos. 3,047,540 and 3,055,845.

THE ORGANIC PHOSPHITE

The organic phosphites which may be used according to the present invention to enhance the reaction rate of the coupling reaction may be defined by the formula:

$$R_3O-P-OR_1$$
$$|$$
$$OR_2$$

wherein $R_1$, $R_2$ and $R_3$ are organic radicals selected from the group of alkyl of from about four to about 12 carbon atoms, alkylene of from about six to about 12 carbon atoms, cyclic alkyl aryl, alkyl mono and di substituted aryl, aryl substituted alkyl and aryl wherein alkyl is from about four to about 12 carbon atoms and aryl is from about five to about eight carbon atoms. Preferably $R_1$, $R_2$ and $R_3$ are all alkyl substituted aryl. Most preferred $R_1$, $R_2$ and $R_3$ are all mono or dinonyl substituted phenyl.

Suitable organic phosphites are tridodecyl phosphite, trinonyl phosphite, trioctyl phosphite, triheptyl phosphite, tripentyl phosphite, tri t-butyl phosphite, tris (trimethylolpropane) phosphite, didodecyl t-butyl phosphite, dinonyl t-butyl phosphite, di-t-butyl nonyl phosphite, dioctyl pentyl phosphite, didodecyl 2,2-diethyloctyl phosphite, tridodecylene phosphite, trinonylene phosphite, trihexylene phosphite, mono- and dibutyl substituted triphenyl phosphite, mono- and dipentyl substituted triphenyl phosphite, mono- and dioctyl substituted triphenyl phosphite, mono- and dinonyl substituted triphenyl phosphite, mono and didodecyl substituted triphenyl phosphite, (octylphenyl) bis (dodecylphenyl) phosphite, bis (nonylphenyl) neodecyl phosphite, bis (nonylphenyl) beta naphthyl phosphite, bis (nonylphenyl) isodecyl phosphite, triphenyl phosphite, tris (phenyldodecyl) phosphite, tris (phenylnonyl) phosphite, tris (phenyloctyl) phosphite, tris (phenylpentyl) phosphite, tris (phenylbutyl) phosphite, bis (phenyldodecyl) phenyloctyl phosphite, bis (phenylbutyl) phenyldodecyl phosphite, bis (phenyldodecyl) phenylbutyl phosphite and the like.

The coupling reaction medium according to the method of the instant invention is preferably substantially anhydrous with a water content below about 0.3 weight percent based upon the total weight of reactive components, preferably below about 0.1 weight percent, and most preferably below from about 0.01 to about 0.04 weight percent.

The coupling reaction may be carried out in an emulsion, suspension or solution system but preferably a melt system is employed wherein all of the reactive components of the copolymer, i.e., the oxymethylene polymer, the dissimilar organic polymer and the isocyanate or isothiocyanate are in the liquid state. Generally temperatures between from about 100° C. and 275° C. are employed, with the range of from about 150° C. to about 250° C. being preferred for a melt state of the preferred oxymethylene copolymers. Lower temperatures in the suitable ranges are particularly preferred, and lower or higher pressures than atmospheric may be employed, although atmospheric pressure is preferred.

The isocyanate or isothiocyanate may be provided in variable amounts but preferably it is provided in amounts between from about 0.5 moles to about 3.0 moles and most preferably between from about 0.8 moles to about 1.2 moles of isocyano, or isothiocyano groups per mole of active hydrogen, defining one gram of active hydrogen as equal to one mole thereof.

The amounts of oxymethylene polymer and dissimilar organic polymer may be provided in variable ratios to allow modification in properties of the produced copolymer, but preferably they are provided in such a ratio so as to produce a copolymer containing from about 20 to about 80 weight percent of oxymethylene polymer, based upon the total weight of the reactive components, and most preferably from about 40 to about 60 weight percent.

The organic tin catalyst may be provided in amounts from about 0.0005 to about 0.05 weight percent based upon the weight of the reactive components and preferably from about 0.005 to about 0.015 weight percent and most preferably about 0.01 weight percent.

The organic phosphite may be provided in amounts up to about 2.5 weight percent, preferably up to about 1.2 weight percent and most preferably from about 0.25 to about 1.0 weight percent based upon the weight of the reactive components.

According to the method of this invention an admixture of an organic tin catalyst and the reactive components, i.e., the oxymethylene polymer, the dissimilar organic polymer and the isocyanate or thioisocyanate is formed and then the organic phosphite is added to enhance the reaction rate.

According to the preferred melt system for carrying out the coupling reaction the admixture of the organic tin catalyst and the reactive components is in the melt state at a temperature of between from about 100° C., to about 275° C., and preferably at a temperature between from about 150° C., to about 250° C. before addition thereto of the organic phosphite.

The melt admixture of the organic tin catalyst and the reactive components may conveniently be achieved by any means known to those skilled in the art for melt mixing, i.e., on a two roll mill, in a single or double screw extruder, in a ribbon blender, in a Banbury mixer or the like.

The melt admixture may be formed by adding the organic tin catalyst to a mixture of the reactive components and then melt mixing the admixture, or a mixture of the reactive components may be melt mixed and the organic tin catalyst added thereto to form the admixture, or the oxymethylene polymer, the dissimilar organic polymer and the isocyanate or isothiocyanate may be individually melted and the organic tin catalyst added to any one of the individually melted components and then all the individually melted components melt mixed together, or the oxymethylene polymer, the dissimilar organic polymer and the isocyanate or isothiocyanate may be individually melted and the organic tin catalyst added to any one of the individually melted components and then any combination of the individually melted components, i.e., the dissimilar organic polymer and the isocyanate or isothiocyanate, premixed before melt mixing with the other individually melted component to form the admixture, or any other sequence or technique may be employed to get a melted admixture of the oxymethylene polymer, the dissimilar organic polymer, the isocyanate or isothiocyanate and the organic tin catalyst before addition thereto of the organic phosphite.

After this melt admixture is achieved the organic phosphite is added thereto under continued melt mixing conditions to enhance the reaction rate of the coupling reaction.

If this sequence is followed a synergistic reaction rate will be observed.

In order that those skilled in the art may better understand how the present invention may be carried into effect the following examples are given by way of illustration and not by way of limitation.

EXAMPLE I

The oxymethylene polymer used in this example is a trioxane-ethylene oxide copolymer containing about 2 weight percent of monomeric units derived from ethylene oxide. It is prepared as previously has been described herein and more specifically in the cited art, e.g., the aforementioned Walling et al. Pat. No. 3,027,352. It is in flake form, and about 70 percent of the copolymer passes through a 40 mesh screen. It has an inherent viscosity (I.V.) of about 1.2 (measured at 60° C. in a 0.1 weight percent solution in p-chlorophenol containing 2 weight percent of alpha-pinene). It has a melt index of about 9.0 (The apparatus used and method of determining melt index are described in ASTM D-1238-57T).

A 50-gram capacity Brabender Plasti-Corder at a temperature of 200° C. and at 50 r.p.m. was charged with 25 grams of the above indentified oxymethylene polymer and 22 grams of poly (butanediol adipate) with a molecular weight of 2,000 and a hydroxyl number of about 56.

3.0 grams of diphenyl methane 4,4'-diisocyanate and 0.5 cc of a 1:100 solution of dibutyltin dilaurate in dodecane were added immediately afterward.

After 5 minutes a torque increase began which reached a full scale deflection of 500 meter-grams after an additional 5 minutes.

What this example describes is that the organic tin catalyst, by itself, slowly catalyzes the coupling reaction.

Other dissimilar organic polymers such as poly (butanediol azelate), poly (hexanediol adipate) and poly (hexanediol azelate) are substituted for the poly (butanediol adipate) of the instant example with substantially similar results.

Oxymethylene homopolymer and an oxymethylene terpolymer comprising 100 parts by weight trioxane, 2 parts by weight of ethylene oxide and 0.05 parts by weight of butanediol diglycidyl ether are substituted for the oxymethylene copolymer of the instant example with substantially similar results.

Stannous octoate is substituted for the dibutyltin dilaurate of the instant Example with substantially similar results.

EXAMPLE II

The procedure of Example I was followed except that 0.5 grams of a tris (mixed mono- and dinonylphenyl) phosphite containing 80 percent mono and 20 percent dinonylphenyl, was used instead of the dibutyltin dilaurate.

A slow torque increase began after 3 minutes, and the reaction was stopped after 18 minutes with a torque reading of 320 meter-grams.

What this example describes is that the organic phosphite, by itself, very slowly catalyzes the coupling reaction.

Other organic phosphites such as tris (mono-nonylphenyl) phosphite, di (nonylphenyl) neodecyl phosphite and tris (dinonylphenyl) phosphite are substituted for the organic phosphite of the instant Example with substantially similar results.

EXAMPLE III 25 grams of the oxymethylene copolymer and 22 grams of the poly (butanediol adipate) of Example I were charged into the Brabender Plasti-Corder as per the procedure of Example I.

3.0 grams of diphenyl methane 4,4'-diisocyanate, 0.5CC of a 1:100 solution of dibutyltin dilaurate in dodecane, and 0.5 grams of a tris (mixed mono- and dinonylphenyl) phosphite containing 80 percent mono and 20 percent dinonylphenyl were added simultaneously, and immediately afterward.

After 4 minutes a torque increase began, reaching 420 meter-grams after 6 additional minutes.

What this example describes is that the simultaneous addition of the organic tin catalyst and the organic phosphite does not enhance the reaction rate of the coupling reaction.

Other dissimilar organic organic polymers such as poly (butanediol azelate), poly (hexanediol adipate) and poly (hexanediol azelate) are substituted for the poly (butanediol adipate) of the instant example with substantially similar results.

Oxymethylene homopolymer and an oxymethylene terpolymer comprising 100 parts by weight trioxane, 2 parts by weight of ethylene oxide and 0.05 parts by weight of butanediol diglycidyl ether are substituted for the oxymethylene copolymer of the instant example with substantially similar results.

Stannous octoate is substituted for the dibutyltin dilaurate of the instant Example with substantially similar results.

Other organic phosphites such as tris (mono-nonylphenyl) phosphite, di (nonylphenyl) neodecyl phosphite and tris (dinonylphenyl) phosphite are substituted for the organic phosphite of the instant example with substantially similar results.

EXAMPLE IV

The procedure of Example III was followed except that the dibutyltin dilaurate was added first, followed 30 seconds later by the tris (mixed mono- and dinonylphenyl) phosphite containing 80 percent mono and 20 percent dinonylphenyl.

After an additional 30 seconds, a sharp torque increase was observed amounting to 470 meter-grams after 2.5 minutes.

What this example describes is that when following the method of the present invention comprising the consecutive steps of (1) forming an admixture of the organic tin catalyst and the reactive components; and then (2) adding the organic phosphite to enhance the reaction rate, a synergistic reaction rate is observed as compared with the reaction rate of the organic tin catalyst itself, or the organic phosphite itself, or over the simultaneous addition of the two together. More specifically, by following the method of the instant invention the total coupling reaction time can be reduced from 10 minutes, as shown in Example I, to 3 minutes, as shown by the instant Example which is an embodiment of the method of the instant invention.

Other dissimilar organic polymers such as poly (butanediol azelate), poly (hexanediol adipate) and poly (hexanediol azelate) are substituted for the poly (butanediol adipate) of the instant example with substantially similar results.

Oxymethylene homopolymer and an oxymethylene terpolymer comprising 100 parts by weight trioxane, 2 parts by weight of ethylene oxide and 0.05 parts by weight of butanediol diglycidyl ether are substituted for the oxymethylene copolymer of the instant Example with substantially similar results.

Stannous octoate is substituted for the dibutyltin dilaurate of the instant Example with substantially similar results.

Other organic phosphites such as tris (monononylphenyl) phosphite, di (nonylphenyl) neodecyl phosphite and tris (dinonylphenyl) phosphite are substituted for the organic phosphite of the instant Example with substantially similar results.

EXAMPLE V 25 grams of the oxymethylene copolymer of Example I was charged into the Bradender Plasti-Corder along with 11 grams each of the poly (butanediol adipate) of Example I and poly (neopentyl adipate) following the procedure of Example I.

3.0 grams of diphenyl methane 4,4'-diisocyanate and 0.5 cc of a 1:100 solution of dibutyltin dilaurate in dodecane were then added.

After 6 minutes of no torque increase, 0.5 grams of tris (mixed mono- and dinonylphenyl) phosphite containing 80 percent mono and 20 percent dinonylphenyl was added. Within a few seconds a sharp torque increase amounting to 435 meter-grams was observed, taking 5.5 minutes to reach full torque.

What this example describes is that the method of the instant invention is applicable for synergistically catalyzing the coupling reaction of an oxymethylene polymer and mixtures of various dissimilar organic polymers.

Other dissimilar organic polymers such as poly (butanediol azelate), poly (hexanediol adipate) and poly (hexanediol azelate) are substituted for the poly (butanediol adipate) and poly (neopentyl adipate) of the instant example with substantially similar results.

Oxymethylene homopolymer and oxymethylene terpolymer comprising 100 parts by weight trioxane, 2 parts by weight of ethylene oxide and 0.05 parts by weight of butanediol diglycidyl ether are substituted for the oxymethylene copolymer of the instant example with substantially similar results.

Stannous octoate is substituted for the dibutyltin dilaurate of the instant example with substantially similar results.

Other organic phosphites such as tris (monononylphenyl) phosphite, di (nonylphenyl) neodecyl phosphite and tris (dinonylphenyl) phosphite are substituted for the organic phosphite of the instant Example with substantially similar results.

EXAMPLE VI 25 grams of the oxymethylene copolymer of Example I was charged into the Brabender Plasti-Corder following the procedure of Example I.

3.0 grams of diphenyl methane 4,4'-diisocyanate was mixed in a beaker under a nitrogen funnel with 22 grams of the poly (butanediol adipate) of Example I, and 0.5 cc of a 1:100 solution of dibutyltin dilaurate in dodecane was added and the resulting mixture quickly poured into the Bradender Plasti-Corder head.

After 30 seconds, 0.5 grams of a tris (mixed mono- and dinonylphenyl) phosphite containing 80 percent mono and 20 percent dinonylphenyl was added. After an additional 30 seconds a torque increase was noted reaching 520 meter-grams after 3 minutes.

What this example describes is that the melt admixture of the organic tin catalyst and the reactive components may conveniently be achieved by any sequence of addition, before addition thereto of the organic phosphite to enhance the reaction rate of the coupling reaction.

Other dissimilar organic polymers such as poly (butanediol azelate), poly (hexanediol adipate) and poly (hexanediol azelate) are substituted for the poly (butanediol adipate) of the instant example with substantially similar results.

Oxymethylene homopolymer and an oxymethylene terpolymer comprising 100 parts by weight trioxane, 2 parts by weight of ethylene oxide and 0.05 parts by weight of butanediol diglycidyl ether are substituted for the oxymethylene copolymer of the instant example with substantially similar results.

Stannous octoate is substituted for the dibutyltin dilaurate of the instant example with substantially similar results.

Other organic phosphites such as tris (monononylphenyl) phosphite, di (nonylphenyl) neodecyl phosphite and tris (dinonylphenyl) phosphite are substituted for the organic phosphite of the instant example with substantially similar results.

It will be understood, of course, by those skilled in the art that the present invention is not limited to the specific oxymethylene polymers, dissimilar organic polymers, coupling agents, organic tin catalysts, or organic phosphites, or to the procedures and percentages that have been given in the foregoing examples for purpose of illustration. For instance, instead of a copolymer of trioxane with from about 0.1 to about 15 mole percent of ethylene oxide, specifically 2 mole percent, there may be employed binary polymers wherein a corresponding molar percentage of dioxolane is substituted for ethylene oxide in making the copolymer.

Also, various other oxymethylene binary and ternary polymers may be used instead of the particular binary and ternary polymers employed in the various examples.

The oxymethylene terpolymers used in the compositions of this invention may be defined as being normally solid, substantially water-insoluble terpolymer of (1) from 75 to 99.9 weight percent of a source of a chain of recurring oxymethylene units, e.g., trioxane; (2) from 0.1 to about 18 weight percent of a bi- or higher multifunctional compound such as a cyclic ether having a single cyclic ether ring having adjacent carbon atoms therein, and having from two to ten carbon atoms in said ring, e.g., ethylene oxide; and (3) from 0.01 to about 7 weight percent of a chain-branching agent having at least two functional oxygen groups and being selected from the group consisting of compounds having at least two cyclic ether rings having from two to 10 carbon atoms in each ring, and dialdehydes and diketones having from two to 20 carbon atoms. An example of a chain-branching agent of (3) is a poly (1,2-epoxide), specifically vinyl cyclohexene dioxide, a sub-group of such terpolymers consists of those having by weight, from about 96.1 to 97.9 percent oxymethylene units, about 2.0 to 2.9 percent of oxyethylene units, and less than about 1 percent, preferably between about 0.05 to 0.80 percent, of units from the chain-branching agent.

The bi- or higher multifunctional (i.e., at least bi-functional) compounds are compounds having at least two reactive centers such that the compound is capable of reacting in an at least bi-functional manner with the source of oxymethylene units and the chain-branching agent to form a normally solid, thermoplastic, moldable terpolymer. The bi- or higher multifunctional compounds used in making the terpolymers provide —O—R— units interspersed among the oxymethylene groups; R in the grouping —O—R— represents a divalent radical containing at least two carbon atoms directly linked to each other and positioned in the chain between the two valences. Such substituents advantageously are, for instance, hydrocarbon, halo-hydrocarbon or other groupings that are inert with respect to formaldehyde under the polymerization conditions.

Preferred compounds that are at least bi-functional employed in making terpolymers include (1) those having at least two functional groups, (2) those having at least one unsaturated bond, (3) those having at least one openable ring structure and (4) combinations of two or more of (1), (2) and (3). Specific examples of compounds that are at least bi-functional and are preferably cyclic ethers having adjacent carbon atoms, include ethylene oxide, 1,3-dioxolane, and others mentioned hereinbefore, in Walling et al. U.S. Pat. No. 3,027,352, the previously cited Kern et al. article, and the aforementioned Heinz et al. Great Britain Pat. No. 1,026,777.

The particular chain-branching agents employed may be varied considerably, the chosen agent depending upon such influencing factors as, for example, the particular relationship and conditions under which it is used, its cost, etc. Among suitable chain-branching agents may be mentioned those having at least two functional oxygen groups including (1) cyclic ethers having at least two cyclic ether rings, e.g., 2,2-(trimethylene) bis 1,3-dioxolane, and particularly those compounds having (a) at least two epoxy rings, such as polyepoxides, including diepoxides, triepoxides, etc., (b) at least two formal rings, e.g., pentaerythritol diformal, and (c) at least one epoxy ring and at least one formal ring, e.g., monocrotylidene trimethylolethane monoepoxide; and (2) compounds having at least two oxo groups such as dialdehydes and diketones, e.g., glutaraldehyde terephthalide and acrolein dimer.

Suitable polyepoxides include those that may be prepared by the epoxidation of compounds having two or more olefinic linkages. Diepoxides of diolefins are usually employed, and the epoxidized olefinic bonds may be of aliphatic or cycloaliphatic structures. More specific examples of diepoxides that may be used include butadiene dioxide, vinylcyclohexane dioxide (1-epoxyethyl-3,4-epoxycyclohexane), linonene dioxide, resorcinol, diglycidyl ether, bis-epoxydicyclopentyl ether of ethylene glycol, dicyclopentadiene dioxide and dicrotylidene pentaerythritol diepoxide. Suitable higher polyepoxides include the various triepoxides, e.g., triglycidyl trimethylol propane.

The preferred terpolymers used in practicing the present invention contain (1) oxymethylene groups interspersed with (2) oxyalkylene groups with adjacent carbon atoms derived from the bi- or higher multifunctional compound employed (preferably a cyclic ether having adjacent carbon atoms) and (3) oxyalkylene groups having carbon atoms linked to other chains, the last-named groups being derived from the chain-branching agent. Still more preferred terpolymers are those wherein the oxyalkylene groups of (2) supra, are oxyethylene groups derived by opening the ring structure of a cyclic ether containing oxyethylene groups, e.g., ethylene oxide, 1,3-dioxolane, and the like.

Specific terpolymers that are useful in practicing the present invention include those obtained by copolymerization of the following components in the stated approximate parts by weight:

100 parts by weight trioxane, 2 parts by weight ethylene oxide and 0.1 parts by weight vinylcyclohexene oxide;
100 parts by weight trioxane, 2 parts by weight ethylene oxide and 0.5 parts by weight diacetal of malonaldehyde and ethylene glycol;
100 parts by weight trioxane, 2 parts by weight ethylene oxide and 2 parts by weight sorbitol triformal;
100 parts by weight trioxane, 2 parts by weight ethylene oxide and 0.5 parts by weight vinylcyclohexene oxide;
100 parts by weight trioxane, 2 parts by weight ethylene oxide and 0.5 parts by weight butadiene dioxide;
100 parts by weight trioxane, 2 parts by weight ethylene oxide and 0.3 parts by weight triepoxide of the triallyl ether of trimethylolpropane;
100 parts by weight trioxane, 12.6 parts by weight 1,3-dioxolane and 0.5 parts by weight vinylcyclohexene dioxide;
100 parts by weight trioxane, 2 parts by weight ethylene oxide and 0.5 parts by weight resorcinol diglycidyl ether;
100 parts by weight trioxane, 2.1 parts by weight ethylene oxide and 0.5 parts by weight pentaerythritol diformal;
100 parts by weight trioxane, 2.2 parts by weight ethylene oxide and 1.0 parts by weight pentaerythritol diformal;
100 parts by weight trioxane, 16.8 parts by weight 1,3-dioxolane and 0.5 parts by weight vinylcyclohexene dioxide;
100 parts by weight trioxane, 2 parts by weight ethylene oxide and 0.1 parts by weight diglycidyl ether of bisphenol A.

It is to be understood that the foregoing detailed description is given merely by way of illustration and that many variations may be made therein without departing from the spirit and scope of the invention.

What is claimed is:

1. In a method for the production of modified oxymethylene polymers by a coupling reaction of reactive components comprising: (A) a normally solid oxymethylene polymer containing at least 60 mole percent of recurring oxymethylene units and (B) a dissimilar organic polymer containing at least two active hydrogen containing groups as determined by the Zerewitinoff method, selected from the group consisting of hydroxyl polyesters and polyhydric polyalkylene ethers, and having a molecular weight of between about 500 and about 5,000 and a hydroxyl number between about 20 and about 250, using a (C) coupling agent defined by the formula R—(CNX)$_n$ wherein X is an atom selected from the group consisting of oxygen and sulfur, n is an integer between 1–3 and R is an organic radical derived from the group consisting of aliphatic, cycloaliphatic and aromatic moieties having one to 20 carbon atoms, and substituted derivatives thereof, where the substituents do not participate in undesirable side reactions and wherein the water content is below about 0.3 weight percent based upon the weight of the reactive components, by:

a. forming a melted admixture of an organic tin catalyst selected from the group consisting of stannous octoate and organic tin catalysts having at least one direct carbon to tin bond, and the oxymethylene polymer, the dissimilar organic polymer and the coupling agent at a temperature of between from about 100° C. to about 275° C., wherein said organic tin catalyst is present at from about 0.0005 to about 0.05 weight percent based upon the weight of the reactive components; and b. adding up to about 2.5 weight percent based upon the weight of the reactive components of an organic phosphite defined by the formula:

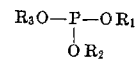

wherein each $R_1$, $R_2$ and $R_3$ is an organic radical selected from the group consisting of alkyl of from about four to about 12 carbon atoms, alkylene of from about about six to about 12 carbon atoms, cyclic alkyl aryl, alkyl mono and di substituted aryl, aryl substituted alkyl, and aryl wherein alkyl is from about four to about 12 carbon atoms and aryl is from about five to about eight carbon atoms; wherein said improvement comprises executing the above steps consecutively to increase the reaction rate.

2. The method of claim 1 wherein said temperature is between from about 150° C. to about 250° C., and the water content is below about 0.1 weight percent based upon the weight of the reactive components.

3. The method of claim 2 wherein said coupling agent is a diisocyanate and is present at between from about 0.5 to about 3.0 moles of isocyano groups per mole of active hydrogen, defining one gram of active hydrogen as equal to one mole thereof, and said oxymethylene polymer is present at from about 20 to about 80 weight percent based upon the weight of the reactive components.

4. The method of claim 3 wherein said dissimilar organic polymer has a molecular weight of between about 1,000 and about 3,000 and a hydroxyl number of between about 30 and about 120, and said oxymethylene polymer is present at from about 40 to about 60 weight percent based upon the weight of the reactive components, and said diisocyanate is present at between from about 0.8 to about 1.2 moles of isocyano groups per mole of active hydrogen defining one gram of active hydrogen as equal to one mole thereof.

5. The method of claim 4 wherein said organic tin catalyst is selected from the group consisting of stannous octoate and organic tin catalysts having from one to three carbon bonds directly to a given tin atom with one or more catalytically intensifying bonds from said tin atom to an atom selected from the group consisting of halogen, hydrogen, oxygen, sulfur, nitrogen or phosphorous and is present at from about 0.005 to about 0.015 weight percent based upon the weight of the reactive components, and wherein each $R_1$, $R_2$ and $R_3$ of the organic phosphite is an alkyl substituted aryl group and said organic phosphite is added at up to about 1.2 weight percent based upon the weight of the reactive components.

6. The method of claim 5 wherein said organic tin catalyst is selected from the group consisting of stannous octoate and dibutyltin dilaurate, and wherein each alkyl substituted aryl group of said organic phosphite is selected from the group consisting of mono- and di- nonyl substituted phenyl and said organic phosphite is added at from about 0.25 to about 1.0 weight percent based upon the weight of the reactive components.

7. The method of claim 6 wherein said oxymethylene polymer is an oxymethylene homopolymer.

8. The method of claim 6 wherein said oxymethylene polymer is an oxymethylene copolymer comprising 85 percent to about 99.9 weight percent recurring —$OCH_2$— groups interspersed with groups of the formula:

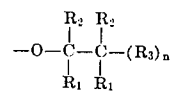

wherein each $R_1$ and $R_2$ is selected from the group consisting of hydrogen, lower alkyl and halogen-substituted lower alkyl radicals each $R_3$ is selected from the group consisting of methylene, oxymethylene, lower alkyl and haloalkyl-substituted methylene, and lower alkyl and haloalkyl-substituted oxymethylene radicals and $n$ is an integer from zero to 3, inclusive, each lower alkyl radical having from one to two carbon atoms, inclusive, said —$OCH_2$— groups consisting from 85 percent to 99.9 percent of the recurring units and said groups represented by the formula:

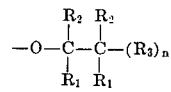

being incorporated during the step of copolymerization to produce said copolymer by the opening up of the ring of a cyclic ether having adjacent carbon atoms by the breaking of an oxygen-to-carbon linkage, and said oxymethylene copolymer is present at from about 40 to about 60 weight percent based upon the total weight of the reactive components.

9. The method of claim 8 wherein said cyclic ether is represented by the formula:

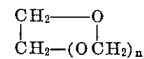

wherein $n$ represents an integer from zero to 2.

10. The method of claim 9 wherein said dissimilar organic polymer is an hydroxyl polyester.

11. The method of claim 10 wherein said hydroxyl polyester is formed from a polycarboxylic acid selected from the group consisting of adipic acid and azelaic acid, and a polyhydric alcohol selected from the group consisting of 1,4 butanediol, 1,6 hexanediol and neopentyldiol, and wherein the water content is below from about 0.01 to about 0.04 weight percent based upon the weight of the reactive components.

12. The method of claim 11 wherein said diisocyanate is diphenyl methane 4,4'-diisocyanate.

* * * * *